US00RE33848E

United States Patent [19]

Shiraishi

[11] E Patent Number: Re. 33,848

[45] Reissued Date of Patent: Mar. 17, 1992

[54] AUTOMATIC WINDSHIELD WIPER SPEED CONTROL WITH PIEZOELECTRIC SENSOR

[75] Inventor: Yasuhiro Shiraishi, Zama, Japan

[73] Assignee: Nissan Motor Company, Limited, Yokohama, Japan

[21] Appl. No.: 69,141

[22] Filed: Jul. 2, 1987

Related U.S. Patent Documents

Reissue of:

[64] Patent No.: 4,527,105
Issued: Jul. 2, 1985
Appl. No.: 527,776
Filed: Aug. 30, 1983

[30] Foreign Application Priority Data

| | | | |
|---|---|---|---|
| Sep. 2, 1982 | [JP] | Japan | 57-151729 |
| Sep. 2, 1982 | [JP] | Japan | 57-151730 |
| Sep. 20, 1982 | [JP] | Japan | 57-162176 |

[51] Int. Cl.[5] ..... B60S 1/08

[52] U.S. Cl. ..... 318/444; 318/483; 318/DIG. 2; 15/250 C

[58] Field of Search ..... 318/443, 444, 483, 643, 318/DIG. 2; 15/250 C, 250.02, 250.13; 73/170 R, 171; 200/61.04, 81 R; 307/10 R, 116, 117, 118; 340/601, 602

[56] References Cited

U.S. PATENT DOCUMENTS

| | | | |
|---|---|---|---|
| 3,649,898 | 3/1972 | Inoue | 318/443 X |
| 3,830,103 | 8/1974 | Andrjkovics et al. | 73/170 R |
| 3,926,120 | 12/1975 | Williams et al. | 102/210 |
| 4,010,383 | 3/1977 | Grassmann | 318/483 X |
| 4,073,193 | 2/1978 | Mastandrea | 73/170 R |
| 4,317,073 | 2/1982 | Blaszkowski | 318/483 |
| 4,329,631 | 5/1982 | Betsch et al. | 318/444 X |
| 4,375,610 | 3/1983 | Nagaoka et al. | 318/444 |
| 4,388,574 | 6/1983 | Bois et al. | 318/444 X |
| 4,389,603 | 6/1983 | Kogawa et al. | 318/444 X |
| 4,463,294 | 7/1984 | Gibson | 318/313 |

FOREIGN PATENT DOCUMENTS

| | | | |
|---|---|---|---|
| 2621116 | 11/1977 | Fed. Rep. of Germany | 318/DIG. 2 |
| 3017982 | 11/1981 | Fed. Rep. of Germany | 318/443 |
| 4931 | 1/1978 | Japan | 318/443 |
| 86422 | 7/1978 | Japan | 318/603 |
| 55-063941 | 5/1980 | Japan . | |
| 57-130747 | 8/1982 | Japan | 318/444 |

OTHER PUBLICATIONS

Electronic Design, vol. 27, p. 19, Sep. 13, 1979.

*Primary Examiner*—Bentsu Ro
*Attorney, Agent, or Firm*—Foley & Lardner

[57] ABSTRACT

A wiper speed control system for an automotive wiper controls the operational speed of a wiper in accordance with rain conditions. The control system includes a rain sensor detecting rain conditions to produce an analog signal having an amplitude depending upon the detected rain conditions. The analog sensor signal is converted into a digital pulse signal by a converter for application to a digital circuit system. A control signal is produced by digitally processing the pulse signal. The control signal is applied to a wiper driver circuit to adjust the operational speed or timing in accordance with the control signal.

38 Claims, 3 Drawing Sheets

AUTOMATIC WINDSHIELD WIPER SPEED CONTROL WITH PIEZOELECTRIC SENSOR

Matter enclosed in heavy brackets [ ] appears in the original patent but forms no part of this reissue specification; matter printed in italics indicates the additions made by reissue.

BACKGROUND OF THE INVENTION

The present invention relates generally to a wiper control system for an automotive windshield wiper, which automatically controls the operating speed of the wiper in dependence upon rain conditions. More particularly, the invention relates to a wiper control system which can avoid the influence of external conditions on detection of rain conditions.

Published Japanese Utility Model Application No. 57-130747, published on Aug. 14, 1982 discloses an automatic control system for an automotive wiper. The automatic control system includes a vibration pick-up which detects vibration of the windshield created by the impact of rain drops. The output signal of the vibration pick-up is amplified, filtered and then compared with a threshold to produce a driver signal when the output signal level exceeds the threshold level.

In this wiper control system, since the comparator compares an analog vibration pick-up output with an analog threshold, and since the amplifier, filter and comparator all perform analog processing, they are apt to be influenced by external conditions such as errors in the operational characteristics of the respective circuit elements, or temperature conditions. These influences may cause the wiper operation to deviate from that required.

SUMMARY OF THE INVENTION

Therefore, it is an object of the present invention to provided a wiper speed control system which satisfactorily and successfully avoids the influence of external conditions on detection of rain conditions.

Another and more specific object of the present invention is to provide a wiper speed control system, which performs digital processing to detect rain conditions and to control operation of the automotive wiper mechanism.

To accomplish the foregoing and other objects, a wiper speed control system according to the present invention includes a control circuit which can convert an analog rain sensor signal into a pulse signal suitable for digital processing. In practice, the pulses of the pulse signal are counted and compared with a predetermined threshold value to produce a driver signal when the counter value becomes equal to the predetermined threshold value.

By controlling the wiper operation according to the digitally processed rain condition data, the influence on detection of the rain conditions due to external conditions can be satisfactorily and successfully avoided.

According to one aspect of the invention, a wiper control system for an automotive wiper comprises a rain sensor for producing a sensor signal having a value indicative of rain conditions, means for producing a digital rain-condition data signal according to the sensor signal value, means for producing a wiper control signal based on said rain-condition data signal, and a wiper driver motor responsive to the wiper control signal to drive a wiper at a rate variable in accordance with the wiper control signal.

In another aspect, a wiper speed control system for an automotive wiper comprises a rain sensor including a vibrator with a sensor surface exposed to rain and vibrating in accordance with rain conditions, the rain sensor producing a sensor signal having an amplitude corresponding to the magnitude of vibration of the vibrator, a converter means for converting the sensor signal into a digital signal representative of the detected rain conditions means for processing the digital signal to produce a driver signal, and a wiper driver motor responsive to the driver signal for driving a windshield wiper at a rate variable in accordance with the driver signal.

BRIEF DESCRIPTION OF THE DRAWINGS

The present invention will be understood more fully from the detailed description given below and from the accompanying drawings of the preferred embodiment of the invention, which, however, should not be taken to limit the invention to the specific embodiments but for explanation and understanding only.

In the drawings.

DESCRIPTION OF THE PREFERRED EMBODIMENT

Figure 1:
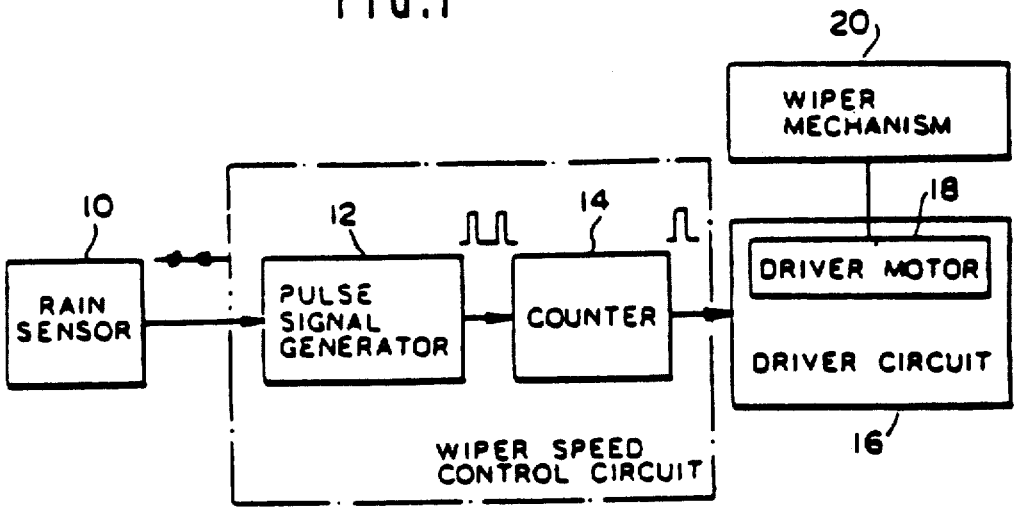
FIG. 1 is a schematic block diagram of the preferred embodiment of a wiper speed control system according to the present invention.

Referring now to the drawings, particularly to FIG. 1, a wiper speed control system of the preferred embodiment of the present invention generally comprises a rain sensor 10 which detect rain conditions and produces a sensor signal having a value indicative of the detected rain conditions. The rain sensor 10 is connected to a pulse signal generator 12 which is adapted to shape the sensor signal and to output a signal in the form of a train of pulses. The pulse train produced by the pulse signal generator 12 has a frequency corresponding to the sensor signal value and so indicating the detected rain conditions. The pulse train is fed to a counter 14. The counter 14 counts the pulses of the pulse train and produces a wiper control signal whenever the counter value reaches a predetermined value. As will be apparent to one of ordinary skill in the art, counter 14 must be either a ring counter or a counter which resets itself after the predetermined value is reached so that it can restart counting the digital pulses from pulse signal generator 12. The wiper control is fed to a driver circuit 16 including a driver motor 18 to drive a wiper mechanism 20.

Figure 2:
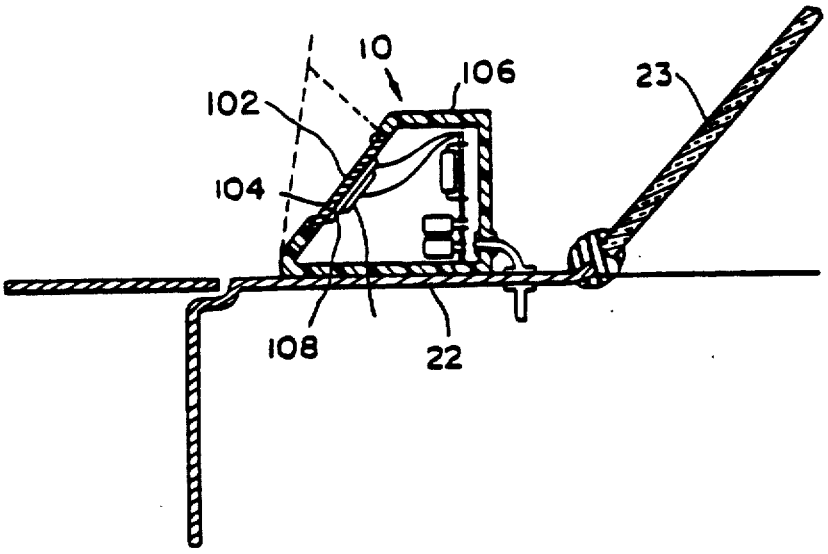
FIG. 2 is a sectional view of a rain sensor employed in the wiper speed control system of FIG. 1.

As shown in FIG. 2, the rain sensor 10 comprises a vibration sensor having a sensor surface 102 inclined essentially parallel to the windshield 23 of a vehicle. The sensor surface 102 is formed on a vibrator panel 104 secured in a sensor housing 106 in turn rigidly secured to a cowl top panel 22 near the windshield 23. A piezoelectric element 108 is secured to the inner surface of the vibrator panel 104 for vibration therewith.

In this design, the rain sensor 10 detects vibrations produced by impact of rain drops on the sensor surface. This is, when rain falls, rain drops impinge on the sensor surface. Shock applied to the sensor surface and the vibrator panel 104 varies depending on the size of the colliding rain drop, its speed at impact and frequency of occurence of its collision. Therefore, the magnitude of vibration caused by impact of rain drops varies depending upon the size of the colliding rain drop, the collision speed and frequency of occurrence of its collision. The piezoelectric element 108 vibrates with the vibrator panel and produces a sensor signal having a value corresponding to the magnitude of vibration.

In summary, the sensor signal produced by the rain sensor in the manner set forth above is an analog signal, the output voltage of which varies in dependence upon the vibration amplitude of the vibrator panel and, in turn, in dependence upon the rain conditions. The pulse signal generator 12 converts the analog signal into a pulse train suitable for digital processing for the purpose of wiper speed control. The counter 14 is a digital counter for counting the pulses from the pulse signal generator 12 and internally compares the counter value with a predetermined threshold value to produce a counter signal when the counter value becomes equal to the threshold value.

When the wipers have been manually selected to operate intermittently, the counter signal can serve as a driver signal activating the driver circuit to operate the wiper mechanism 20. In this case, the timing of occurrences of the counter signal corresponds to the interval between successive wiper operations, the frequency of which varies in dependence upon rain conditions. However, according to the shown embodiment it is also possible to control the wiper operational speed depending upon the detected rain conditions, even in low- or high-speed continuous operation modes. In this case, wiper speed control may be performed by adjusting the voltage to be applied to the driver motor 18 in accordance with the frequency of occurrence of the counter signal.

Figure 3:
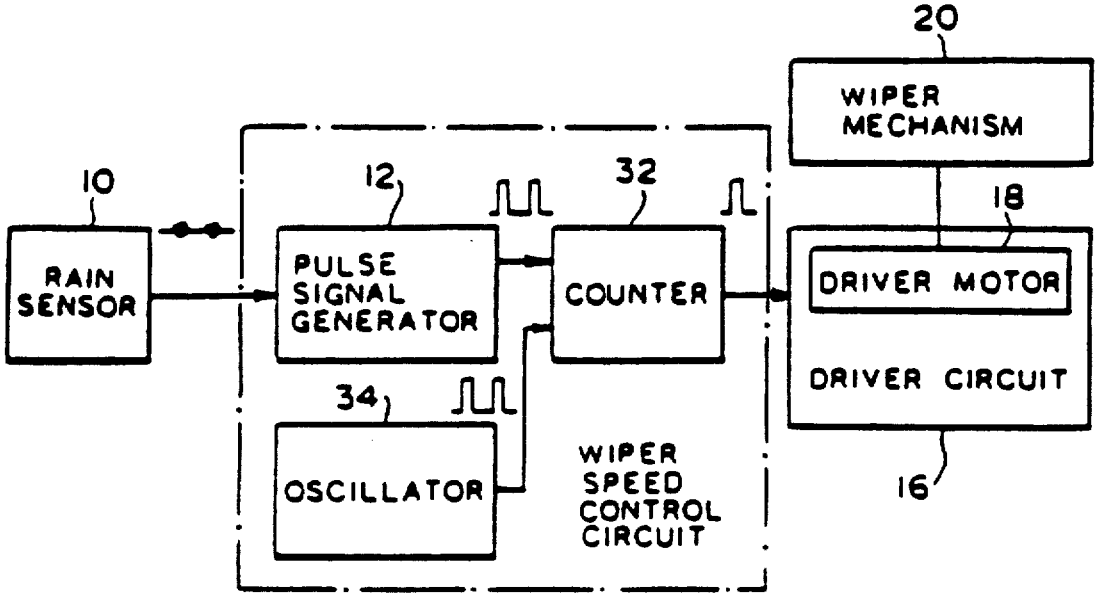
FIG. 3 is a schematic block diagram of a modification of the wiper speed control system of FIG. 1.

FIG. 3 shows a modification of the foregoing preferred embodiment of wiper speed control system according to the present invention. In this modification, a rain sensor 10 is associated with the pulse signal generator 12. As in the foregoing preferred embodiment, the rain sensor 10 produces an analog sensor signal having a value indicative of the rain conditions. The pulse signal generator 12 converts the analog sensor signal into a pulse train having a frequency corresponding to the sensor signal value. The pulse signal generator 12 is connected to a counter 32. The counter 32 is also connected to an oscillator 34 which is adapted to output a pulse train with a constant frequency. The counter 32 counts the pulses from both the pulse signal generator 12 and the oscillator 34 and produces a counter signal when the counter value, which represents the total number of pulses from the pulse signal generator and the oscillator 34, become equal to the predetermined threshold.

Figure 4:
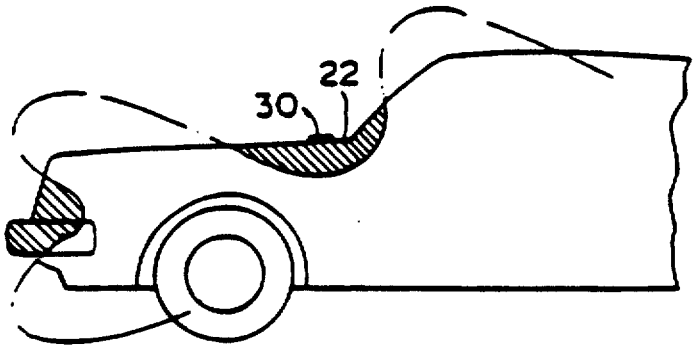
FIG. 4 is a diagram illustrating location of a rain sensor on a vehicle with regard to dynamic air pressure.
Figure 5:
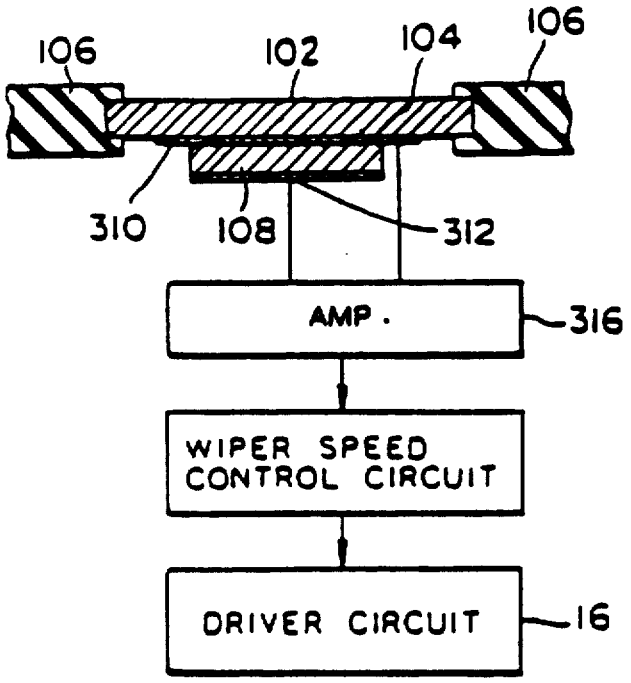
FIG. 5 is a diagram of application of the rain sensor to the wiper speed control system of FIG. 3.

As shown in FIGS. 4 and 5, the rain sensor 10 is mounted on the cowl top panel 22 of the vehicle body at a point subject to positive pressure from the air stream, as indicated by hatched area in FIG. 4. If the rain sensor 10 is mounted on the vehicle body at a point subject to negative dynamic air pressure, the air pressure may adversely influence detection of rain conditions, since the angle of incidence of the rain will be affected by the influence of the air pressure.

The sensor surface 102 of the rain sensor 10 is inclined at a given angle with respect to the horizontal plane such that the rear edge is higher than the front edge. The angle of inclination of the sensor surface with respect to horizontal plane is empirically selected to fall within the range of from 5° to 25°. Normally, rain drop speed is approximately 1 m/sec. to 15 m/sec. In this normal rain condition, the selected inclination angle of the sensor surface, i.e. 5° to 25° is satisfactory for detecting rain condition under usual vehicle speed i.e., approximately 10 to 55 miles per hour.

Preferably, the rain sensor would be provided with a sensor surface which can be variably inclined in dependence upon the rain drop speed. Dynamic air pressure reflecting vehicle speed may be used as a detecting parameter to control the inclination angle of the sensor surface.

As in the foregoing embodiment, the rain sensor 10 includes a vibrator panel 104 with a sensor surface 102 exposed by a sensor housing 106. The vibrator panel 104 engages the sensor housing 106 only at its circumferential edge so that it can vibrate in response to impact of rain drops on the sensor surface. A piezoelectric element 108 is secured to the vibrator panel 104 via an electrode 310 formed therebetween. Another electrode 312 is formed on the opposite surface of the piezoelectric element 108. The electrodes 310 and 312 are electrically connected to an amplifier 316. The amplifier 316 is connected to the wiper speed control circuit, including the pulse signal generator 12, the counter 32 and the oscillator 34, to supply the sensor signal thereto.

Figure 6:
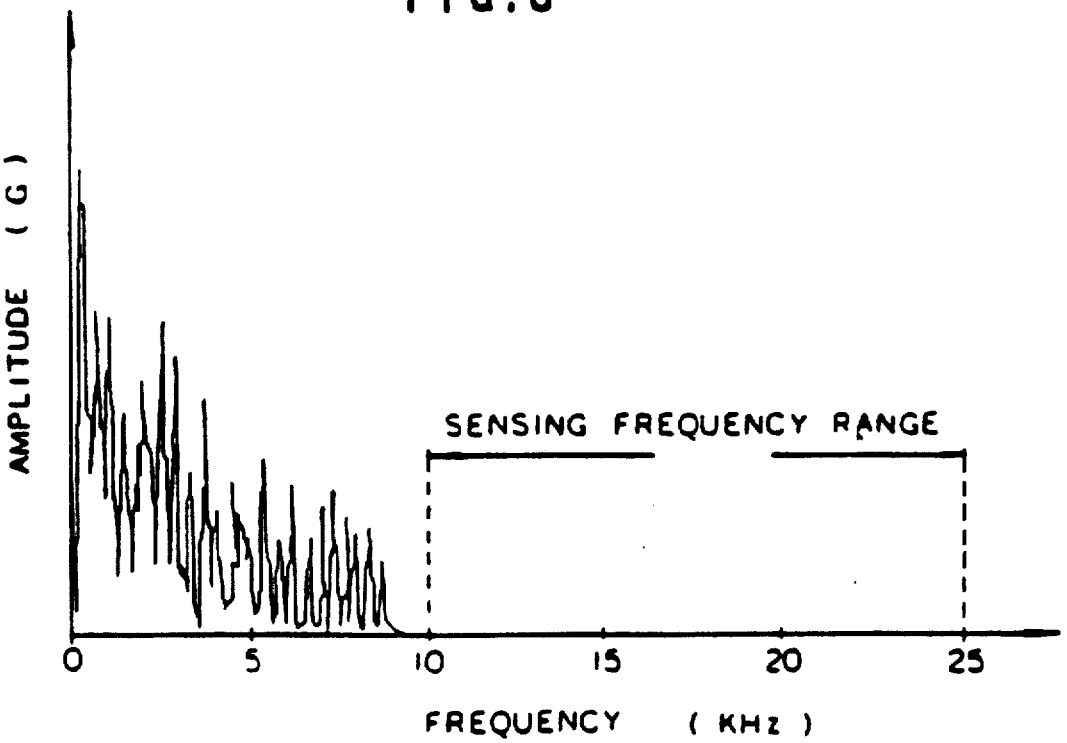
FIG. 6 illustrates the vibration frequency spectrum acting on the rain sensor.

The natural or natural resonant frequency of the vibrator panel 104 is chosen to fall in the range of 10 KHz to 25 KHz. This specific natural frequency of the vibrator panel is experimentarily selected to avoid the influence of vibrations created by the vehicle horn or other equipment or engine vibrations. FIG. 6 shows the vibration frequency spectrum created by vehicle horn and received by the rain sensor. As will be appreciated from FIG. 6, the maximum frequency of vibration created by the vehicle horn is approximately 9 KHz. Therefore, by selecting the natural frequency of the vibrator panel 104 in the given range, i.e., 10 KHz to 25 KHz, the influence of the vehicle horn upon detection of the rain conditions can be satisfactorily avoided.

The maximum natural frequency of the vibrator panel 104 is selected in view of the amplitude of the sensor signal. To achieve a natural resonant frequency of the vibrator panel 304 beyond 25 KHz, the vibrator panel has to be adequately thick in relation to the area of the sensor surface. In this case, the amplitude of vibration produced by impact of rain drops onto the sensor surface will be too low to be used in the wiper control system. That is, by setting the natural frequency of the vibrator panel so high, the sensivity to rain will be lowered, thereby degrading the response characteristics of the wiper control system.

In this modification, since the counter signal is produced when the total number of pulses from both the pulse signal generator and the oscillator reaches the predetermined threshold, the wiper mechanism can be driven at the lowest interval in intermittent operational mode or at the lowest speed in continuous operational mode, as defined by pulse period of the pulse train from the oscillator. As a result, the wiper mechanism will continue to operate even when the vehicle passes through a tunnel in which rain drop cannot be detected. This will be advantageous for providing clear vision for the driver.

It should be noted that the sensor surface subjected to rain should be larger than 100 $mm^2$ in area in accordance with experimental results. In experimental tests, it was found that a rain drop impinging on a plane surface usually expands to an area of approximately 100 $mm^2$. It is necessary to provide a sensor surface sufficiently large to receive the full volume of rain water upon impact in order to detect the rain conditions. Otherwise, a plurality of rain sensors, each of which has a sensor surface area of less than 100 $mm^2$, can be used so that the total effective area of the sensor surface exceeds 100 $mm^2$.

As set forth above, according to the present invention, an analog sensor signal is converted into a pulse train so that the influence of errors in the circuit element characteristics, temperature conditions and so forth can be avoided.

What is claimed is:

1. A control system for controlling a windshield wiper comprising:

rain sensor means for sensing the rate of rain and generating sensor signals indicative of the sensed rain rate;

means responsively connected to the rain sensor means for generating digital pulses having a frequency corresponding to the sensed rain rate in response to the sensor signals;

means responsively connected to the means for generating digital pulses for counting the digital pulses and generating a wiper control signal every time a predetermined number of the digital pulses has been counted;

a signal generator for outputting a constant-frequency digital signal to said counting means, said counting means being responsive to both the number of the digital pulses and the number of pulses in the digital signal in generating said wiper control signal; and means responsively connected to the counting means for driving the windshield wiper through one cycle whenever the wiper control signal is generated.

2. A control system for controlling a windshield wiper comprising:

a driver motor associated with the windshield wiper for driving the windshield wiper at a variable rate;

a rain sensor including a vibrator with a sensor surface exposed to rain and vibrating in accordance with the rate of rain, said rain sensor producing a sensor signal having an amplitude which varies in accordance with the magnitude of vibration of said vibrator;

means for converting the sensor signal into a train of digital pulses having a frequency corresponding to the sensed rain rate in response to the sensor signal; and a drive signal generator receiving the train of digital pulses and including counting means for counting the number of pulses in said train of digital pulses, generating a drive signal for driving the driver motor for one cycle of wiper operation whenever a given number of pulses are received.

3. The control system as set forth in claim 2, wherein said rain sensor further includes a piezoelectric element detecting the magnitude of vibration of said vibrator and producing said sensor signal with an amplitude corresponding to the vibration magnitude of said vibrator.

4. The control system as set forth in claim 3, wherein said [converter means] *converting means* comprises means for shaping said sensor signal into [a train] *said train* of digital pulses.

5. The control system as set forth in claim 4, wherein said drive signal generator comprises a counter which counts the pulses of said pulse train and produces said driver signal whenever the [counter value] *counted value* reaches a predetermined value.

6. The control system as set forth in claim 5, wherein said driver motor is responsive to said driver signal to drive said windshield wiper through one cycle so as to control the timing between intermittent strokes of the wiper in dependence upon said driver signal.

7. The control system as set forth in claim 6, wherein said sensor surface has an area of more than 100 $mm^2$.

8. The control system as set forth in claim 3, wherein said vibrator of said rain sensor is provided the natural resonant frequency in a range of from approximately 10 KHz to approximately 25 KHz.

9. The control system as set forth in claim 3, wherein said rain sensor is mounted on [a cowl top panel of the vehicle] *the cowl top of a vehicle* and said sensor surface is inclined approximately parallel to a windshield.

10. The control system as set forth in claim 3, wherein said rain sensor is mounted on [a cowl top panel of the vehicle] *the cowl top of a vehicle* and said sensor surface is inclined facing forward at an angle of about 5° to 25°.

11. A control system for controlling a windshield wiper comprising:

rain sensor means for sensing the rate of rain and generating sensor signals indicative of the sensed rain rate;

means responsively connected to the rain sensor means for generating digital pulses having a frequency corresponding to the sensed rain rate in response to the sensor signals;

means responsively connected to the means for generating digital pulses for counting the digital pulses and generating a wiper control signal every time a predetermined number of the digital pulses has been counted; and means responsively connected to the counting means for driving the windshield wiper through one cycle whenever the wiper control signal is generated;

wherein said rain sensor means comprises a vibration sensor which detects the rain conditions by detecting vibrations created by the impact of a raindrop onto a sensor surface thereof, said vibration sensor comprising a vibrator having said sensor surface and a piezoelectric element for detecting magnitude of vibration of said vibrator to produce said sensor signals.

12. The control system as set forth in claim 11, wherein said sensor surface of said rain sensor means has an area greater than 100 $mm^2$.

13. The control system as set forth in claim 11, wherein said vibrator of said rain sensor *means* has a natural resonant frequency in a range of from approximately 10 KHz to approximately 25 KHz.

14. The control system as set forth in claim 11, wherein said sensor surface is inclined to be approximately parallel with the windshield.

15. The control system as set forth in claim 11, wherein said sensor surface is inclined upward front-to-rear with respect to vehicle travel at an angle of 5° to 25° to the horizontal.

16. A control system for controlling a windshield wiper comprising:

rain sensor means comprising a vibration sensor which detects rain conditions by detecting vibrations created by the impact of a raindrop onto a sensor surface thereof, said vibration sensor comprising a vibrator having said sensor surface inclined to be approximately parallel with the windshield and a piezoelectric element for detecting magnitude of vibration of said vibrator to generate sensor signals indicative of the sensed rain rate means responsively connected to the rain sensor means for generating digital pulses having a frequency corresponding to the sensed rain rate in response to the sensor signals;

means responsively connected to the means for generating digital pulses for counting the digital pulses and generating a wiper control signal every time a predetermined number of the digital pulses has been counted;

a signal generator for outputting a constant-frequency digital signal to said counting means, said counting means being responsive to both the number of digital pulses and the number of pulses in said digital signal in generating said wiper control signal; and means responsively connected to the counting means for driving the windshield wiper through one cycle whenever the wiper control signal is generated.

17. A control system for controlling a windshield wiper comprising:

rain sensor means comprising a vibration sensor which detects rain conditions by detecting vibrations created by the impact of a raindrop onto a sensor surface thereof, said vibration sensor comprising a vibrator having said sensor surface inclined upward front-to-rear with respect to the direction of vehicle travel at an angle of 5° to 25° to the horizontal and a piezoelectric element for detecting magnitude of vibration of said vibrator to generate sensor signals indicative of the sensed rain rate means responsively connected to the rain sensor means for generating digital pulses having a frequency corresponding to the sensed rain rate in response to the sensor signals;

means responsively connected to the means for generating digital pulses for counting the digital pulses and generating a wiper control signal every time a predetermined number of the digital pulses has been counted;

a signal generator for outputting a constant-frequency digital signal to said counting means, said counting means being responsive to both the number of digital pulses and the number of pulses in said digital signal in generating said wiper control signal; and means responsively connected to the counting means for driving the windshield wiper through one cycle whenever the wiper control signal is generated.

18. A control system for controlling a windshield wiper comprising:

a rain sensor including a vibrator with a sensor surface exposed to rain and vibrating in accordance with the rate of rain, and further including a piezoelectric element detecting the magnitude of vibration of said vibrator and producing a sensor signal having an amplitude which varies in accordance with the magnitude of vibration of said vibrator;

means for converting the sensor signal into a train of digital pulses having a frequency corresponding to the sensed rain rate, said converting means comprising means for shaping said sensor signal into [a train] *said train* of digital pulses;

a driver signal generator receiving the train of digital pulses and comprises a counter which counts the number of pulses in said pulse train and produces a driver signal whenever the counted number of pulses reaches a predetermined value;

a pulse generator adapted to output a constant-frequency pulse signal to said counter, said counter counting the pulses from both said constant-frequency pulse signal and said digital signal to produce said driver signal whenever the sum of the pulses from [said converter means] *said converting means* and the pulses from said pulse generator reaches the predetermined value; and a driver motor associated with said windshield wiper and responsive to said driver signal for driving said windshield wiper through one cycle so as to control the timing between intermittent strokes of the wiper in dependence on the driver signal.

19. An intermittent timing control system for an automotive wiper system comprising:

a windshield wiper;

a wiper motor for driving said wiper, said wiper motor being controllable to drive said wiper at a variable sweep speed and operative for driving said wiper at variable intervals in an intermittent mode of operation;

a rain sensor having a sensor surface exposed to rain for detecting the rate of rain, vibrating in response to an impact of raindrops on said sensor surface at a magnitude and frequency depending upon the rate of rain, and producing a sensor signal having an amplitude and frequency corresponding to the magnitude and frequency of vibration of said sensor surface;

a pulse generation for producing a train of pulses corresponding to said sensor signals and having a frequency depending upon the rate of rain; and counting means receiving said train of pulses and producing a drive signal for operating [said driver motor] *said wiper motor* for one cycle of wiper operation whenever a given number of pulses are received.

20. An intermittent timing control system for an automotive wiper system comprising:

a windshield wiper;

a wiper motor for driving said wiper, said wiper motor being controllable to drive said wiper at a variable sweep speed and operative for driving said wiper at variable intervals in an intermittent mode of operation;

a rain sensor having a vibrator adapted to oscillate at an amplitude and frequency depending upon the rate of rain, said vibrator having one surface exposed outwardly and inclined to be approximately parallel with the windshield so that raindrops directly collide with said one surface for causing oscillation of said vibrator, and said vibrator producing a sensor signal having an amplitude and frequency corresponding to the magnitude of vibration and frequency thereof;

means responsively connected to the rain sensor for generating digital pulses at a frequency corresponding to the frequency of said sensor signals;

means, responsively connected to said generating means, for counting the number of digital pulses;

a signal generator for outputting a constant-frequency digital signal to said counting means, and said counting means being responsive to both the number of digital pulses and the number of pulses in said digital signal in generating [said wiper control signal] *a wiper control signal;* and means responsive to said sensor signal indicative of the magnitude and frequency of vibration of said vibrator for deriving an intermittent timing signal for wiper intermittent operation based on the sensor signal value.

*21. An intermittent timing control system for a wiper system of a vehicle, comprising:*

*a windshield wiper;*

*a wiper motor for driving said wiper, said wiper motor being controllable to drive said wiper at a variable sweep speed and operative for driving said wiper at variable intervals in an intermittent mode of operation;*

*a rain sensor having a vibrator adapted to oscillate at an amplitude and frequency depending upon the rate of rain, said vibrator having one surface exposed outwardly of said vehicle so that raindrops directly collide with said one surface for causing oscillation of said vibrator, said one surface of said sensor being mounted on a point on the body of said vehicle subject to positive pressure from an air stream travelling over said vehicle and said vibrator producing a sensor signal having an amplitude and frequency corresponding to the magnitude of vibration and frequency of said one surface; and*

*means responsive to said sensor signal indicative of the magnitude and frequency of vibration of said vibrator for deriving an intermittent timing signal for wiper intermittent operation based on the sensor signal value.*

*22. The control system as set forth in claim 21 wherein said one surface of said rain sensor has an area greater than 100 mm$^2$.*

*23. The control system as set forth in claim 21 wherein said one surface of said rain sensor is inclined at an angle relative to the horizontal.*

*24. The control system as set forth in claim 23 wherein said angle is in the range of 5 degrees to 25 degrees.*

*25. The control system as set forth in claim 24 wherein said angle is variable in dependence on raid drop speed.*

*26. The control system as set forth in claim 21 wherein said one surface is mounted on a cowl top panel of said vehicle.*

*27. A control system for controlling a windshield wiper of a vehicle, comprising:*

*a driver motor associated with the windshield wiper for driving the windshield wiper;*

*a rain sensor for sensing rain and producing sensor signals indicative of the sensed rain, said rain sensor including a sensor surface having a variable angle of inclination with respect to the horizontal which is mounted on an external surface of said vehicle body at an orientation in front of a front windshield, which orientation subjects said sensor surface to positive pressure from an air stream travelling over said vehicle; and*

*means responsive to said sensor signal for deriving a driving signal for said driver motor.*

*28. A control system as set forth in claim 27 wherein said sensor surface is mounted on a cowl top panel of said vehicle.*

*29. A control system for controlling a windshield wiper of a vehicle comprising:*

*a variable inclination rain sensor for sensing the rate of rain and generating sensor signals indicative of the sensed rain date, said sensor being mounted on an external portion of the vehicle body at an orientation in front of a front windshield, which orientation subjects said sensor to positive pressure from an air stream passing over said vehicle;*

*means responsively connected to the rain sensor for generating digital pulses having a frequency corresponding to the sensed rain rate in response to the sensor signals;*

*means responsively connected to the means for generating digital pulses for counting the digital pulses and generating a wiper control signal every time a predetermined number of the digital pulses has been counted; and*

*means responsively connected to the counting means for driving the windshield wiper through one cycle whenever the wiper control signal is generated.*

*30. A rain sensor for use in an intermittent timing control system for a wiper system of a vehicle, which wiper system includes a windshield wiper, a wiper motor for driving said wiper, said wiper motor being controllable to drive said wiper at a variable sweep speed and operative for driving said wiper at variable intervals in an intermittent mode of operation, and a wiper control circuit associated with said wiper motor for operating the latter at a controlled timing, said wiper control circuit being responsive to a rain condition indicative sensor signal for deriving said timing, wherein said rain sensor comprises:*

*a sensor housing mounted on an external surface of an vehicle body adjacent a front windshield;*

*a vibrator supported on said sensor housing and adapted to oscillate at an amplitude frequency depending upon the rate of rain, said vibrator having one surface exposed outwardly to the atmosphere so that raindrops directly collide with said one surface for causing oscillation of said vibrator, said one surface of said vibrator being inclined at a given angle determined in relation to the inclination of the front windshield, and said vibrator producing said rain condition indicative sensor signal having an amplitude and frequency corresponding to the magnitude of vibration and frequency of said one surface.*

*31. A rain sensor as set forth in claim 30 wherein said inclination angle is in the range of 5 degrees to 25 degrees.*

*32. A rain sensor as set forth in claim 30 wherein said one surface is mounted on a cowl top panel of said vehicle.*

*33. A rain sensor for use in an intermittent timing control system for a wiper system of a vehicle, which wiper system includes a windshield wiper, a wiper motor for driving said wiper, said wiper motor being controllable to drive said wiper at a variable sweep speed and operative for driving said wiper at variable intervals in an intermittent mode of operation, and a wiper control circuit associated with said wiper motor for operating the latter at a controlled timing, said wiper control circuit being responsive to a rain condition indicative sensor signal for deriving said timing, wherein said rain sensor comprises:*

*a sensor housing mounted on an external surface of an vehicle body adjacent a front windshield;*

*a vibrator supported on said sensor housing and adapted to oscillate at an amplitude and frequency depending upon the rate of rain, said vibrator having one surface exposed outwardly to the atmosphere so that raindrops directly collide with said one surface for causing oscillation of said vibrator, said one surface of said vibrator having an area greater than or equal to 100 mm2, and said vibrator producing said rain condition indicative sensor signal having an amplitude and frequency corresponding to the magnitude of vibration and frequency of said one surface.*

*34. A rain sensor as set forth in claim 33, wherein said vibrator one surface being inclined at an angle in the range of 5 degrees to 25 degrees in relation to the inclination of the front windshield.*

*35. A rain sensor as set forth in claim 33 wherein said one surface is mounted on a cowl top panel of said vehicle.*

*36. A rain sensor for use in an intermittent timing control system for a wiper system of a vehicle, which wiper system includes a windshield wiper, a wiper motor for driving said wiper, said wiper motor being controllable to drive said wiper at a variable sweep speed and operative for driving said wiper at variable intervals in an intermittent mode of operation, and a wiper control circuit associated with said wiper motor for operating the latter at a controlled timing, said wiper control circuit being responsive to a rain condition indicative sensor signal for deriving said timing, wherein said rain sensor comprises:*

*a sensor housing mounted on an external surface of a vehicle body adjacent a front windshield;*

*a vibrator supported on said sensor housing and adapted to oscillate at an amplitude and frequency depending upon the rate of rain, said vibrator having one surface exposed outwardly to the atmosphere so that raindrops directly collide with said one surface for causing oscillation of said vibrator, said one surface of said vibrator being inclined at a given angle determined in relation to the inclination of the front windshield, and said vibrator producing said rain condition indicative sensor signal having an amplitude and frequency corresponding to the magnitude of vibration and frequency of said one surface.*

*37. A rain sensor as set forth in claim 36 wherein said inclination angle is in the range of 5 degrees to 25 degrees.*

*38. A rain sensor as set forth in claim 36 wherein said one surface is mounted on a cowl top panel of said vehicle.*

* * * * *